United States Patent [19]

Schreiber, Jr. et al.

[11] Patent Number: 5,078,593
[45] Date of Patent: Jan. 7, 1992

[54] METHOD FOR RECOVERY OF ENERGY VALUES OF OILY REFINERY SLUDGES

[75] Inventors: Robert J. Schreiber, Jr., Richmond Heights; Fred A. Lafser, Jr., University City; Carolyn Yonely, Webster Groves, all of Mo.

[73] Assignee: Industrial Waste Management, Inc., St. Louis, Mo.

[21] Appl. No.: 547,784

[22] Filed: Jul. 3, 1990

[51] Int. Cl.$^5$ .................... F27B 15/00; F27B 7/02; F23G 7/04
[52] U.S. Cl. ..................... 432/103; 432/14; 432/105; 432/106; 110/219; 110/235; 110/238; 110/246; 110/346
[58] Field of Search .......... 432/1, 14, 103, 105, 432/106; 110/218, 219, 224, 225, 235, 238, 246, 346

[56] References Cited

U.S. PATENT DOCUMENTS

| | | | |
|---|---|---|---|
| Re. 26,514 | 12/1968 | Albertson et al. | 110/219 X |
| 4,153,411 | 5/1979 | Isheim | 110/246 X |
| 4,583,470 | 4/1986 | Hirose | 110/224 X |
| 4,627,877 | 12/1986 | Ogawa et al. | 432/14 X |
| 4,850,290 | 7/1989 | Benoit et al. | 110/346 |
| 4,921,538 | 5/1990 | Lafser | 106/100 |
| 4,922,841 | 5/1990 | Kent | 110/235 X |
| 4,952,147 | 8/1990 | Boyden, II et al. | 432/103 |
| 4,957,048 | 9/1990 | Beer et al. | 110/235 |

FOREIGN PATENT DOCUMENTS 0124038 4/1984 European Pat. Off. .

OTHER PUBLICATIONS

Tischler/Kocurek, "Evaluation of BDAT Standards for Petroleum Refining Wastes Using New Waste and Treatment Data", Oct. 1987, [Prepared for Am. Petroleum Inst., Washington, D.C.].

Krogbeumker et al., "Safety Arrangements for the Auxiliary Combustion of Waste Oils Containing PCB in Rotary Cement Kilns", 264, Zement-Kalk-Gips, 41, Apr. 1988.

Mozens et al., "Future Options for Disposal of Hazardous Wastes", Chemistry and Industry, Jun. 16, 1985.

EPO Search Report 89 30 6111.

Title: Burning Sewage Sludge in Cement Kilns, Chem. Abst. 107(2):11916g, (World Cement, 1987, 18(2), 57-9, 62, 64).

Title: The Use of Industrial Sludges as Raw Materials in the Cement Industry, Chem. Abst., 105(26):231465H, (Waste Mgmt. Res., 1986, 4(3), 293-302).

Title: Destruction of Chlorinated Hydrocarbons in a Cement Kiln, Chem. Abst., 92(14):115856a, (Swedish Water Air Pollution Res. Institute).

*Primary Examiner*—Henry A. Bennett
*Assistant Examiner*—Christopher Kilner
*Attorney, Agent, or Firm*—Senniger, Powers, Leavitt & Roedel

[57] ABSTRACT

Method for disposal of oily refinery sludges containing a hydrocarbon component, a solids component comprising sediments such as sand, silt, rust or scale, and water in an operating rotary kiln comprising a heated, rotating cylinder containing in-process mineral matter comprising analyzing the oily refinery sludge to determine its composition, drying the oily refinery sludge to a bulk granular material having an energy content of at least about 4,000 BTU per pound, and charging the dried bulk granular material to the rotary kiln and burning the bulk granular material therein.

20 Claims, 2 Drawing Sheets

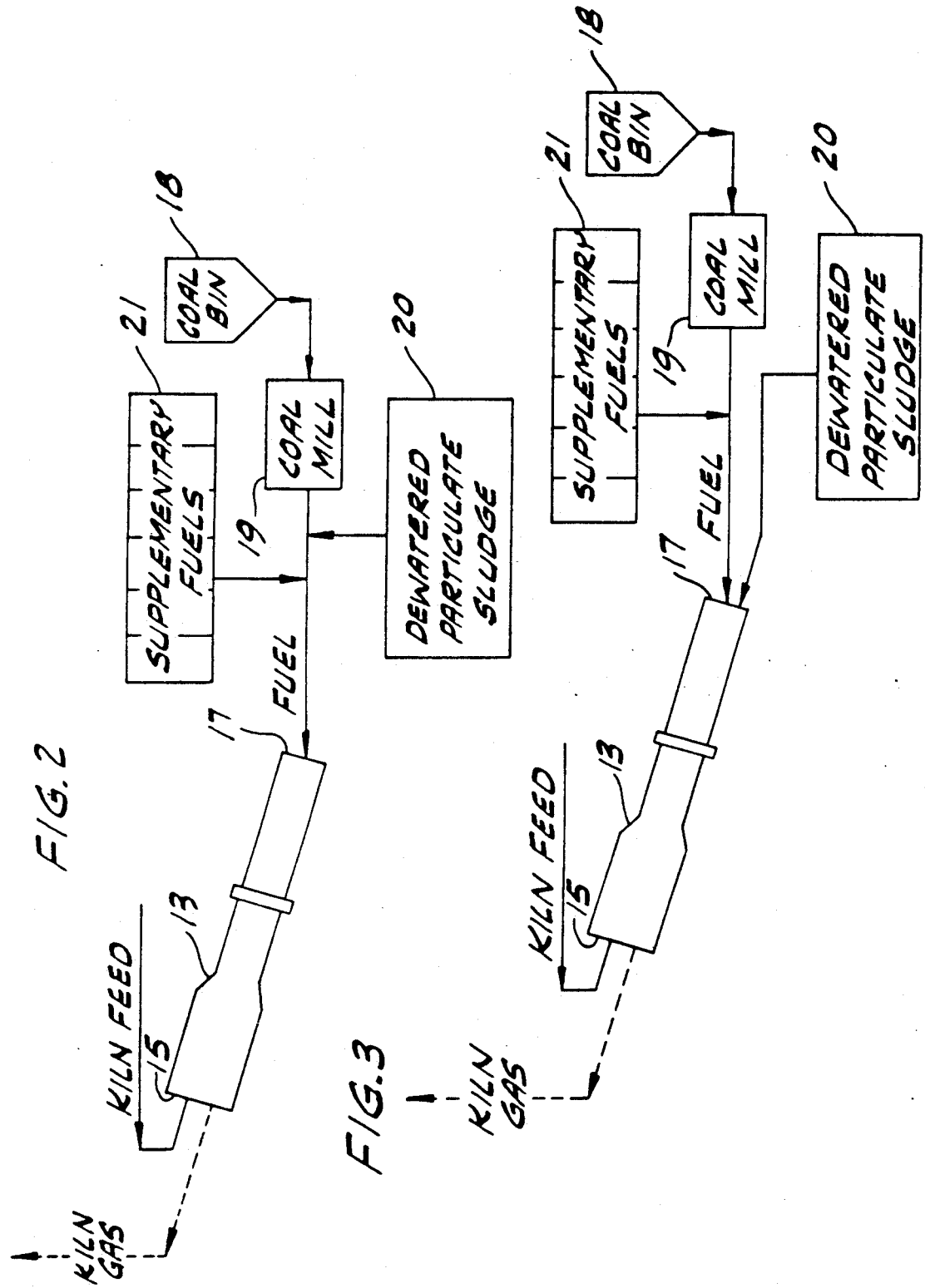

METHOD FOR RECOVERY OF ENERGY VALUES OF OILY REFINERY SLUDGES

BACKGROUND OF THE INVENTION

The present invention is directed to a method for recovery of the energy values of oily refinery sludges, in general, and to a method for the use of such materials as a fuel source in a rotary mineral processing kiln, such as a lime, light-weight aggregate, asphalt or cement kiln, in particular.

Oily refinery sludges are generally described as oily solids consisting primarily of finely divided particles (which may or may not exhibit suspension characteristics) contained in or removed from aqueous streams. In addition to oil and water, such sludges often comprise sediments such as sand and silt that accompany the crude oils into the refinery, other materials such as heavy metals and organics, and corrosion/erosion products that result from refinery operations. Prior to dewatering, such sludges typically contain about 40 to 90 percent water by weight.

Petroleum refineries have a number of sources of oily refinery sludges. For instance, water which may be contaminated with oil is typically diverted to large concrete sumps called API separators where an oily sludge is separated from the water. The clarified water from the API separators may then be further purified by coagulation of impurities in floatation tanks, such as dissolved air floatation tanks, with the impurities being removed as an oily sludge. Other sources for oily refinery sludges include heat exchanger bundles, slop oil emulsion solids and tank bottoms.

Until recently, such sludges have been sent to a settling lagoon for dewatering. No further treatment was required nor typically performed. However, recent environmental concerns have created a need for further treatment of such materials.

The primary treatment method currently being proposed is incineration to destroy the organics or solvent extraction of the sludge to remove the hazardous organics followed by landfilling. However, the energy content of the material is not recovered in this method and the associated costs are somewhat prohibitive.

SUMMARY OF THE INVENTION

Among the objects of the present invention, therefore, is the provision of a safe, environmentally sound method for disposal of oily refinery sludges; the provision of such a method in which the energy content of the organic components of oily refinery sludges are recovered; and the provision of such a process in which toxic inorganic components are incorporated into a product or by-product which is not hazardous.

Briefly, therefore, the present invention is directed to a method for disposal of oily refinery sludges in an operating rotary kiln comprising a heated, rotating cylinder containing in-process mineral matter. The method comprises drying the oily refinery sludge to a bulk granular material having an energy content of at least about 4,000 BTU per pound. The dried bulk granular material is then charged to the kiln and burned for energy recovery. The resulting ash is incorporated in the in-process mineral matter.

Other objects and features of this invention will be in part apparent and in part pointed out hereinafter.

BRIEF DESCRIPTION OF THE DRAWINGS

FIG. 2 is a schematic of a kiln illustrating the charging of dewatered particulate sludge according to the method of this invention.

FIG. 3 is a schematic of a kiln illustrating the charging of dewatered particulate sludge according to the method of this invention.

DESCRIPTION OF A PREFERRED EMBODIMENT

Figure 1:
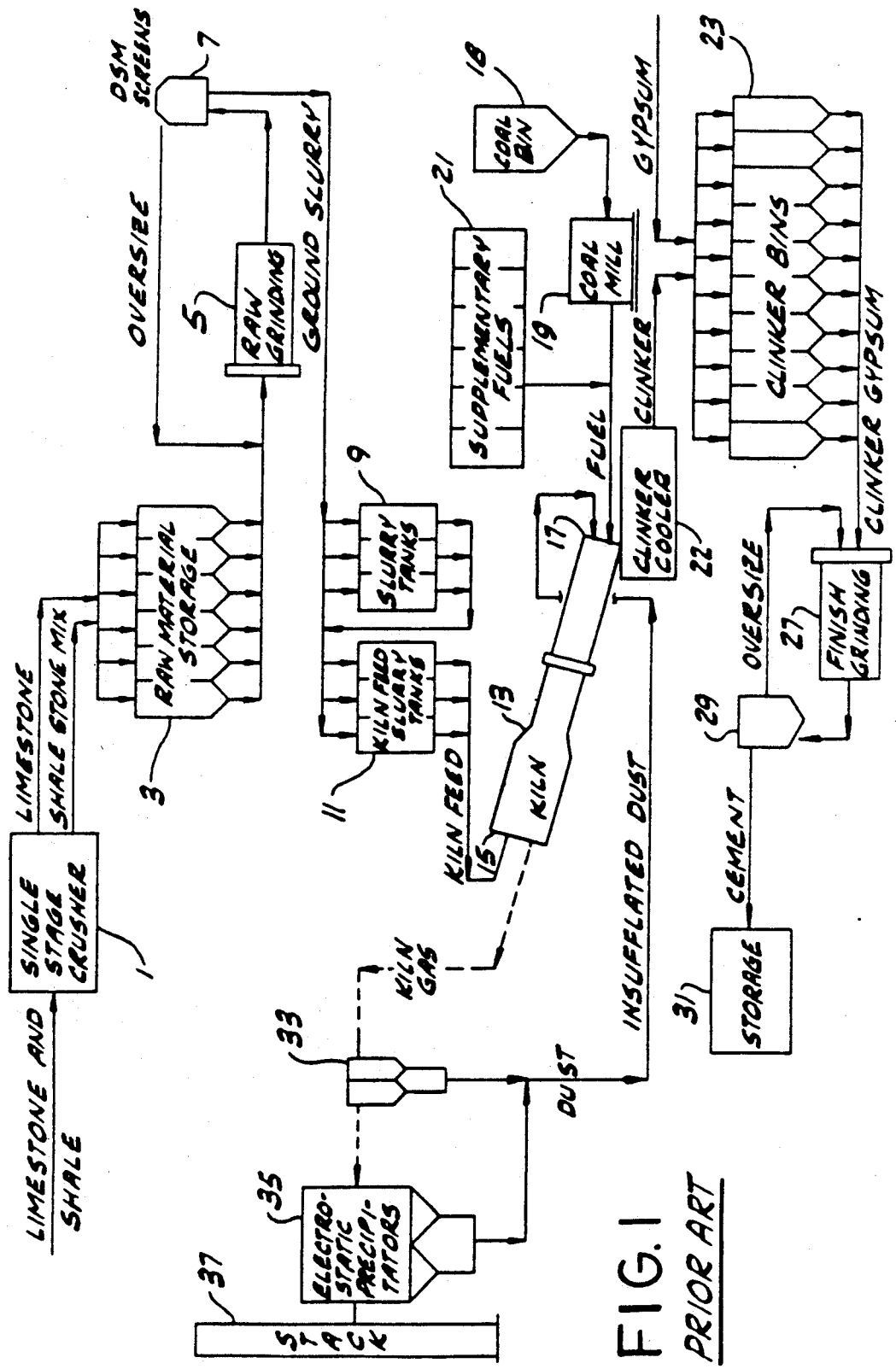
FIG. 1 is a flow plan for a prior art wet process, Portland cement manufacturing process.

Oily refinery sludge compositions comprise both organic and inorganic components, varying from one refinery to the next and often varying within a refinery depending upon time and source. Factors likely to affect the composition include crude oil characteristics, composition and quantity of wastewater, spills and leaks, blowdown, refinery housekeeping, refinery size and age, and segregation of oil drains.

Characteristically, oily refinery sludges contain an oil and gas fraction, a water fraction and a solids fraction. Prior to dewatering, the oil and gas fraction typically constitutes about 15–45% by weight of the sludge and includes paraffins, napthenes, asphalts or other oils, with the oil and gas fraction having an API gravity less than about 75° API. Prior to dewatering, the solid fraction typically constitutes in excess of about 3% by weight of the sludge and includes sediments such as sand, silt, rust, and scale and other inorganic components including various sulfur containing compounds and metals such as arsenic, barium, cadmium, chromium, lead, mercury, nickel, selenium, silver, and vanadium and compounds containing such metals. As noted previously, such sludges typically contain in the range of about 40 to 90 percent water by weight prior to dewatering.

In accordance with the present invention, it has been discovered that such oily refinery sludges resulting from the treatment and handling of aqueous effluents, and in particular, from API separators and air floatation devices, may be safely used as a fuel source in mineral processing rotary kilns. After being dried to a bulk granular material having an energy content in excess of about 4,000 BTU per pound, the sludge is charged to a rotary kiln containing in-process mineral matter and burned to recover the energy value of its organic constituents. With the high temperatures required for processing of the mineral matter in rotary kilns, fuel costs constitute a significant factor in the cost of the product. These fuel costs may be advantageously reduced by burning of the dewatered sludge in accordance with the present invention.

In addition, the majority of the inorganic constituents of the oily refinery sludges are advantageously incorporated in and contribute to the mineral value of the in-process mineral matter. Significantly, inorganic constituents such as the toxic metals go through a chemical and/or physical change in the process of the present invention. Particularly in the elevated temperatures of the firing zone of the kiln, toxic metals are generally chemically combined to form non-leachable complex silicates and aluminates. The inorganic constituents yield an appreciable quantity of ash upon burning, typically in the range of about 20–40% based upon the weight of dewatered granular sludge material.

Prior to dewatering, oily refinery sludges typically have a water content in excess of 60 percent by weight and an energy content of substantially less than 4000 BTU per pound. In this form, the material is difficult to handle and has insufficient energy content to be used by itself as a fuel in the rotary kiln. However, upon sufficient dewatering, typically to a water content of less than about 60% by weight, the oily refinery sludge becomes a bulk granular material that can be handled mechanically, for instance by means of a screw conveyor, bucket elevator, belt conveyor or pneumatically, and has an energy content in excess of about 4,000 BTU per pound.

To reduce transportation costs, the oily refinery sludge may be dewatered at the petroleum refinery and transported to the kiln as a bulk granular material having a sieve size smaller than about ¼ inch. Preferably, the bulk granular material is stored in tanks and transported in trucks/railroad cars having cone shaped bottoms which can be connected to a pneumatic or mechanical transport system for transferring the material to or from a tank or to the kiln for burning. A screw conveyor may be advantageously used to transport the material from the cone-shaped bottom of the tanks/cars/trucks to a pneumatic transport system.

Rotary kilns can be of the conventional long type or of the so-called preheater or precalciner type. Common to each, however, is a heated, rotating cylinder containing in-process mineral matter. The in-process mineral matter may be, for instance, lime, light-weight aggregate, asphalt, or cement raw materials. The requisite temperatures for processing the mineral matter are achieved by burning fuel such as gas, fuel oil, powdered coal and the like in a burning zone of the kiln.

In what is known as long dry or wet process cement kilns, the entire mineral heating process is conducted in the rotating kiln cylinder. The cylinder is typically 8–30 feet in diameter and at least about 250 feet in length. As the cylinder is rotated, raw materials fed into the cold, upper end of the kiln cylinder move toward the hot, discharge end of the kiln where the final clinkering process takes place.

In FIG. 1, a flow plan for a prior art, wet process, cement making process is depicted. Typical raw materials, such as clay, shale, limestone and silica are crushed in crusher 1 and stored in raw material storage tanks 3. For the manufacture of cement, the raw materials are ground in the wet raw grinding mill 5, sized to about 200 mesh through DSM screens 7 and slurried with water (about 34 wt. % water). The sized, slurried material is routed to the slurry tanks 9 and the kiln feed slurry tanks 11. To meet the necessary ingredient requirements for cement, each of the slurry tanks 11, contains a raw material slurry that differs in composition. Consequently, the operator can achieve the correct blend necessary for cement manufacture in the kiln feed slurry tanks 11, by adding water or raw materials to the kiln feed slurry tanks as necessary.

The kiln feed slurry is introduced to the rotary kiln 13 through the cold end 15 of the rotary kiln. Coal stored in bin 18 is ground in mill 19 and introduced to hot end 17 of the rotary kiln. The coal may be supplemented by fuel from supplementary fuel source 21. Immediately inside the rotary kiln, the fuel is ignited.

After entering the kiln, the slurry travels down the kiln, passing through three stages. The first is the drying stage where the water from the slurry is evaporated. A series of chains (not shown) are preferably used in this section to enhance the heat exchange process. The second stage comprises a heating process where calcination occurs in the range of 1050°–1850° F. As the material reaches 1850° F., the clinker forming process begins, where materials partially become liquid. Clinkering occurs in the range of 1850°–2650° F. This is principally the mechanism by which small particles are agglomerated into bulk materials. The third stage is the firing zone where the fuel is ignited; the temperature of the in-process material in the firing zone is about 2500°–2800° F.

Cement clinker is removed from the hot end 17 of the kiln 13 and cooled in the clinker cooler 22. After cooling, the clinker is transferred to the clinker bins 23 along with gypsum to form a mixture comprising about 5 wt. % gypsum. Thereafter, the clinker/gypsum blend is ground at the finish grinding station 29 and sent to storage bins 31.

Exhaust gasses from rotary kiln 13 are removed from the cold end 15 and transferred to the expansion chamber 33 and the electrostatic precipitator 35 or other air pollution control device and then to stack 37. Dust from the expansion chamber 33 and the electrostatic precipitator or other air pollution control devices are returned to the hot end 17 of the rotary kiln 13.

Preheater or precalciner kilns are similar to the long dry or wet process kilns except that the preheater or precalciner kilns have an apparatus for preheating or precalcining the mineral matter before it is charged to the upper end of the rotating kiln. Consequently, the kiln is typically much shorter than kiln cylinders in conventional long dry or wet process kilns.

The dewatered particulate sludge may be charged to the rotary kiln for burning in any number of methods. In one method, as illustrated in FIG. 2, dewatered granular material 20 having an energy content of at least about 4,000 BTU per pound, preferably at least 5,000 BTU per pound, is blended with ground coal or coke and the blended material is then handled in a manner identical to that in which ground coal and coke are handled as fuels, i.e., pneumatically or mechanically charged to a zone of the kiln in which fuel is burned, preferably the firing zone. The blend preferably should have an energy content of at least about 8,000 BTU per pound.

In another method, as illustrated in FIG. 3, the dewatered particulate sludge 20 is charged directly to a zone of the kiln in which fuel is burned, preferably the firing zone, without prior mixing or blending with another fuel. When charged to the kiln directly, the dewatered particulate material should have an energy content of at least 4,000 BTU per pound, preferably at least 5,000 BTU per pound, and most preferably greater than about 8,000 BTU per pound.

In a third method, the dewatered particulate sludge is slurried with a liquid fuel and the slurry is then charged to a zone of the kiln in which fuel is burned, preferably the firing zone. For use in this method, the dewatered particulate material should have an energy content of at least 4,000 BTU per pound, preferably at least 5,000 BTU per pound, and the slurry should have an energy content of at least about 8,000 BTU per pound.

Prior to charging to the rotary kiln, the sludge must be dewatered. Preferably, the sludge is dewatered in stages with the first stage consisting of dewatering the material in belt or plate presses, centrifuges, filters or equivalent mechanical means. Such mechanical means may be conveniently used to reduce the water content of the sludge to about 40 to 60 percent by weight. If additional drying is desired, the sludge is preferably thermally dried to a water content of less than about 20 percent by weight through the use indirect fired heating devices. For example, the sludge may be dried by placing a quantity of the sludge in a rectangular box having hollow screw augers therein which move the sludge from one end of the box to another, with steam, hot oil, air or other media circulated within the hollow augers to transfer heat to the sludge. Selection of the most appropriate method depends on such factors as the volume of the slurry, solids content of the waste stream, space availability and the degree of dewatering required. However, because of the nature of the material, it is not economically practical, nor necessary, to dry the sludge to a water content of less than about 5 percent by weight.

Preferably, the dewatered granular sludge is charged to the firing zone of the rotary kiln for burning. Particularly where the rotary kiln is coupled to a preheater or precalciner, the dewatered granular sludge may be additionally charged to the preheating or precalcining section for burning.

For the manufacture of Portland cement, the compositional limits of the kiln raw material feed mixture are approximately as follows (on a loss-free basis):

|  | Wt. Percent |
|---|---|
| $CaO$ | 60–67 |
| $SiO_2$ | 17–25 |
| $Al_2O_3$ | 3–8 |
| $Fe_2O_3$ | 0.5–6 |
| $MgO$ | 0.1–5.5 |
| $Na_2O + K_2O$ | 0.5–1.3 |
| $SO_3$ | 1–3 |

However, the composition of the kiln feed mixture varies from one cement producer to the next, depending upon the composition of the raw materials, such as limestone, clay, shale and silica and minor additional constituents available to the producer. Thus, the suitable raw material mix used to satisfy the necessary chemical composition varies widely across the nation with natural resources specific to the area of the producer usually predominating. More than 30 different materials are known to be used in this process.

To insure that the ash resulting from the burning of the oily refinery sludge does not upset the requisite chemical composition of the in-process mineral matter, the sludge should be analyzed prior to being charged to the kiln. The results of this analysis may then be used to determine what limits, if any, should be imposed upon the quantity of sludge burned as fuel and/or if the chemical composition of the kiln raw material feed mixture should be adjusted to take into account the mineral contribution of the sludge to the in-process mineral matter. Moreover, sludge containing inorganic compositions in concentrations known to deleteriously affect the quality of the resulting mineral product should be excluded from the process.

Thus, the process of the present invention constitutes an environmentally sound method for disposal of the hazardous sludge. By burning the dewatered oily refinery sludge in a mineral processing kiln, principal organic hazardous constituents can be destroyed at a level of at least 99.99% efficiency accompanied by correspondingly minimal emissions of other possible environmental contaminants.

In view of the above, it will be seen that the several objects of the invention are achieved and other advantageous results attained.

As various changes could be made in the above process without departing from the scope of the invention, it is intended that all matter contained in the above description shall be interpreted as illustrative and not in the limiting sense.

What is claimed is:

1. A method for disposal of oily refinery sludges containing hydrocarbons, sediment, and at least about 5 percent water by weight in an operating rotary kiln comprising a heated, rotating cylinder containing in-process mineral matter, the rotary kiln having a firing zone in which fuel is ignited, the method comprising
   analyzing the oily refinery sludge to determine its composition,
   providing the oily refinery sludge as a dried bulk granular material having an energy content of at least about 4,000 BTU per pound, and
   charging the dried granular material to the firing zone of the rotary kiln as a bulk material and burning the bulk material therein.

2. The method of claim 1 wherein the rotary kiln is a conventional long dry or wet process rotary cement kiln having an upper, cold end through which a cement raw material mixture is charged to the kiln and a lower, hot end through which cement clinker is discharged and which comprises the firing zone.

3. The method of claim 2 wherein the dried bulk granular material is blended with coal or coke, or slurried with a liquid fuel prior to being charged to the firing zone of the kiln.

4. The method of claim 3 wherein the blended or slurried material has an energy content of at least about 8,000 BTU per pound.

5. The method of claim 1 wherein the dried bulk granular material has a water content of less than about 60 percent by weight.

6. The method of claim 1 wherein the dried bulk granular material has a water content of between about 20 percent and about 60 percent by weight.

7. The method of claim 1 wherein the dried bulk granular material has a water content of between about 20 percent and about 40 percent by weight.

8. The method of claim 1 wherein the dried bulk granular material has an energy content of at least about 5,000 BTU per pound.

9. The method of claim 1 wherein the dried bulk granular material has an energy content of at least about 8,000 BTU per pound.

10. The method of claim 1 wherein the dried bulk granular material has a water content of less than about 20 percent by weight.

11. The method of claim 1 wherein the in-process mineral matter has a chemical composition suitable for the preparation of light-weight aggregate, lime, or asphalt.

12. A method for disposal of oily refinery sludges in an operating rotary kiln comprising a heated, rotating cylinder containing in-process mineral matter, the oily refinery sludge being the product of an API separation process or an air flotation process, the rotary kiln having a firing zone in which fuel is ignited, the method comprising
   analyzing the oily refinery sludge to determine its composition, providing the oily refinery sludge as a dried bulk granular material having an energy content of at least about 4,000 BTU per pound, and charging the dried granular material to the firing zone of the rotary kiln as a bulk material and burning the bulk material therein.

13. A method as set forth in claim 12 wherein the oily refinery sludge contains hydrocarbons, sediment and at least about 5 percent water by weight.

14. The method of claim 12 wherein the rotary kiln is a conventional long dry or wet process rotary cement kiln having an upper, cold end through which a cement raw material mixture is charged to the kiln and a lower, hot end through which cement clinker is discharged and which comprises the firing zone.

15. The method of claim 14 wherein the dried bulk granular material is blended with coal or coke, or slurried with a liquid fuel prior to being charged to the firing zone of the kiln.

16. The method of claim 15 wherein the resulting blend or slurry has an energy content of at least about 8,000 BTU per pound.

17. The method of claim 13 wherein the dried bulk granular material has a water content of between about 5 percent and about 60 percent by weight.

18. The method of claim 13 wherein the dried bulk granular material has an energy content of at least about 5,000 BTU per pound.

19. The method of claim 13 wherein the dried bulk granular material has a water content of between about 5 percent and about 20 percent by weight.

20. The method of claim 13 wherein the in-process mineral matter has a chemical composition suitable for the preparation of light-weight aggregate, lime, or asphalt.

* * * * *